United States Patent [19]
Denison

[11] 4,452,589
[45] Jun. 5, 1984

[54] ARC WELDING SIMULATOR

[76] Inventor: Tom G. Denison, 930 D St., Pullman, Wash. 99163

[*] Notice: The portion of the term of this patent subsequent to Mar. 5, 2000 has been disclaimed.

[21] Appl. No.: 292,934

[22] Filed: Aug. 14, 1981

[51] Int. Cl.³ .............................................. G09B 9/00
[52] U.S. Cl. .................................. 434/234; 219/373; 219/380
[58] Field of Search ....................................... 434/234

[56] References Cited

U.S. PATENT DOCUMENTS

| | | | |
|---|---|---|---|
| 1,286,529 | 12/1918 | Cave | 434/234 |
| 2,326,944 | 8/1943 | Holand et al. | 434/234 |
| 2,333,192 | 11/1943 | Moberg | 434/234 |
| 3,449,546 | 6/1969 | Dhoble | 219/216 |
| 3,867,769 | 2/1975 | Schow et al. | 434/234 |
| 4,041,615 | 8/1977 | Whitehill | 434/234 |
| 4,132,014 | 1/1979 | Schow | 434/234 |

Primary Examiner—William H. Grieb
Attorney, Agent, or Firm—Christensen, O'Connor, Johnson & Kindness

[57] ABSTRACT

An arc welding simulator for instructional use includes a handpiece that supports a retractably mounted heat tube. The handpiece and heat tube are sized and shaped to resemble an actual electric arc welding apparatus, including an electrode. The simulator includes a drive mechanism for retracting the heat tube at a predetermined rate that simulates consumption of an actual arc welding electrode. A source of hot, pressurized air provides a stream of hot air through the heat tube. The simulator is used in combination with heat-sensitive paper that is preferably imprinted with a predetermined pattern resembling the pattern of movement that is followed during actual arc welding. A trainee uses the simulator by attempting to superimpose a thermal trace on the imprinted pattern. The resulting trace provides a permanent record of a trainee's success in tracking the imprinted pattern and correctly holding the simulator so as to maintain the tip of the heat tube positioned at a proper angle and distance with respect to the surface of the paper. In preferred embodiments of the welding simulator, a heating element is provided at the tip of the heat tube in combination with a small diameter air orifice tube so as to provide a narrow stream of heated air from the tip of the tube. Additionally, the simulator may be provided with a tilt switch and an acoustic alarm to alert the trainee when the simulator is moved from a predetermined angular position.

13 Claims, 4 Drawing Figures

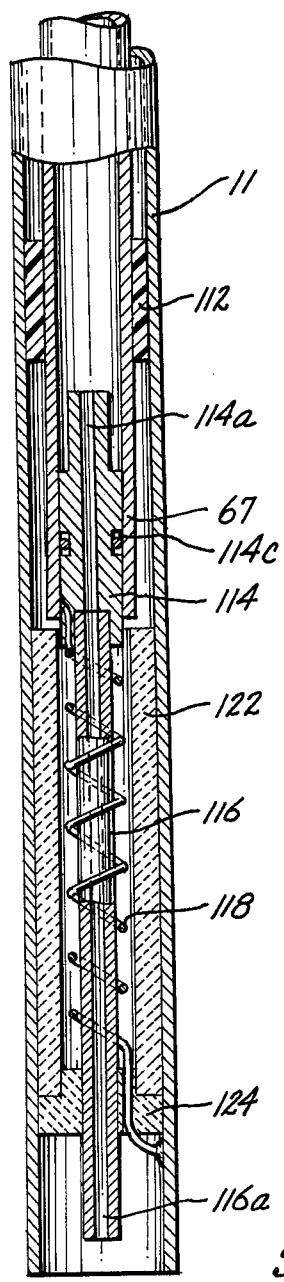
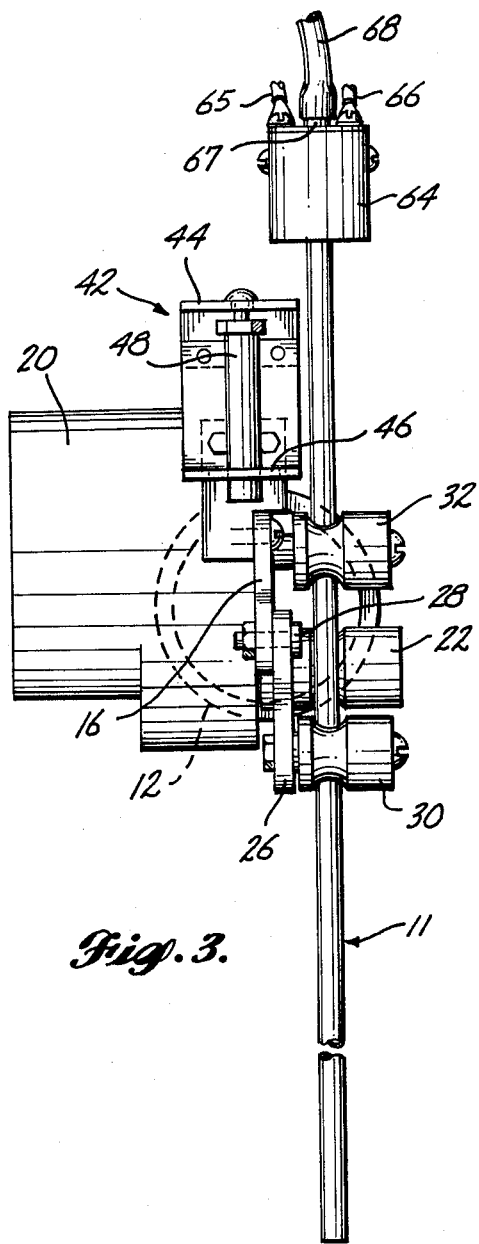
Fig. 3.
Fig. 4.

ARC WELDING SIMULATOR

BACKGROUND OF THE INVENTION

This invention relates generally to welding equipment and, more particularly, to training devices for use in the instruction of electric arc welding.

Complex motor skills must be learned to master the art of electric arc welding. Such skills are dictated in large part by the nature of the welding process. For example, the tip of the welding rod, or electrode, must be maintained at a substantially constant, predetermined distance from the workpiece to maintain a suitable electric arc. The rod becomes stuck if it is allowed to contact the hot metal puddle, and the arc extinguishes if the rod is withdrawn too far from the workpiece. Thus, the distance from the tip of the rod to the workpiece must be kept within a narrow range. This distance must be maintained even as the welding rod is consumed and thereby progressively shortened. Thus, the trainee must learn to continuously feed the rod into the electric arc at a predetermined rate to compensate for consumption of the rod, and at the same time maintain the tip of the rod spaced from the workpiece by a predetermined distance. Further, the tip of the welding rod must be advanced across the workpiece at a predetermined, substantially constant speed to form a welded bead, or seam, of uniform consistency, strength and appearance. Moreover, in accordance with conventional welding practice, the rod must be moved in a rhythmic back-and-forth pattern as it is advanced across the workpiece. The actual shape of this pattern varies depending on the type of weld joint being formed. Finally, the welding rod must be held at a predetermined, substantially constant angle with respect to the surface of the workpiece, even as the rod is advanced across a workpiece of irregular shape.

A trainee must learn to execute all of the foregoing movements smoothly, simultaneously and without interruption. Further, the trainee must learn to apply the technique to workpieces of different shapes and orientations. All of this requires the development of complex motor skills that require a high level of eye-hand coordination.

Electric arc welding has traditionally been taught with the use of actual welding equipment, at considerable cost in time and supplies. This approach has not been altogether satisfactory, however, because the development of the requisite motor skills is actually hindered by the use of actual welding equipment, for several reasons. First, a trainee's vision is significantly impaired by the protective welding helmet that must be worn. In this regard, the protective lenses in the helmet are so dark that a trainee can only see what he is doing when the arc is on, yet much time is spent in the early stages of learning with the arc extinguished as the trainee learns how to handle the welding rod. For the same reason, it is difficult for an instructor to monitor a trainee's progress and provide instruction under actual welding conditions. Further, defects in a welded joint made by a trainee are not always immediately apparent. The discovery of such defects may require resorting to radiographic analysis or destructive bend testing, with considerable delay between the time the joint is made and the time the test results are obtained. All of the foregoing circumstances combine to increase the likelihood that a trainee will develop bad habits in the initial stages of learning, which habits are thereafter difficult to correct.

Accordingly, it is the object and purpose of the present invention to provide an electric arc welding simulator for use in the instruction of electric arc welding.

It is also an object of the present invention to provide a welding simulator that simulates the consumption of a welding rod.

It is another object of the present invention to provide a welding simulator with which a trainee can practice the advancing of a welding rod over a workpiece with a predetermined pattern of movement.

It is yet another object of the present invention to provide a welding simulator that cues the trainee in the event the trainee fails to hold the simulator at a predetermined orientation.

SUMMARY OF THE INVENTION

In accordance with the present invention, a welding simulator suitable for use in the instruction of electric arc welding is provided. The simulator includes a handpiece that generally resembles an actual welding rod holder in size, weight and configuration. A heat tube resembling an actual welding rod extends from the handpiece. The heat tube is retractably mounted on the handpiece such that it may be retracted at a constant rate that simulates the consumption of an actual welding rod. The handpiece includes a drive mechanism coupled to the heat tube for retracting the heat tube at a predetermined rate. The tube is connected to a source of pressurized air. Pressurized air is conducted through the tube and heated so as to be projected in a stream from the end of the tube.

The welding simulator is used in combination with a heat-sensitive paper. The stream of hot air projected from the heat tube produces an immediately visible colored trace on the paper. The shape and visual density of the trace formed on the paper vary considerably depending on the distance from the tip of the heat tube to the paper, the angle at which the tube is held, and the rate at which the tube is advanced across the paper. Thus, the trace on the paper provides a sensitive and accurate indicator of the trainee's progress in learning to correctly control the tip of the heat tube. The heat-sensitive paper is preferably imprinted with a predetermined pattern that represents a pattern of movement that would be employed with an actual electrode in arc welding. The trainee attempts to follow the pattern and superimpose upon it a thermal trace with the simulator. In addition to recording the trainee's success at tracking the printed pattern, the thermal trace also indicates the trainee's success at holding the tip of the heat tube at the correct angle and distance from the paper, as indicated by variations in the width, density and shading of the trace. The heat-sensitive paper thus provides an immediately visible and permanent record of the trainee's progress.

In another aspect of the invention, the handpiece includes a tilt switch that actuates a buzzer or other audible signalling device in the event the trainee fails to hold the handpiece in a predetermined angular orientation. The tilt switch is adjustable to enable the trainee to practice holding the handpiece in various positions.

In accordance with other aspects of the invention, an electrical heating element is provided at the tip of the retractable heat tube such that the air is heated as it is emitted from the end of the tube. This eliminates the necessity of providing a source of hot pressurized air and more closely simulates the actual welding environment.

In another aspect of the invention, the tip of the simulator tube is provided with a small orifice such that a narrow stream of air is projected therefrom. The advantage of employing a small, high-pressure stream of air is that the trace made on the heat-sensitive paper is thereby made more sensitive to the distance and angle from the tip of the heat tube to the paper. A very narrow trace is made when the tip is held closely against the paper, whereas a wide, blurred trace is made if the tip is held at a greater distance from the paper. This feature provides a clear indication of the precision with which a trainee is able to control the positioning of the tip of the heat tube.

These and other aspects and advantages of the invention will become more apparent to one of ordinary skill in the art by reading the following detailed description with reference to the accompanying FIGURES.

BRIEF DESCRIPTION OF THE DRAWINGS

FIG. 3 is a front end view of the simulator handpiece; and

FIG. 4 is a cross section of the tip of the simulator heat tube.

DETAILED DESCRIPTION OF THE PREFERRED EMBODIMENT

Figure 1:
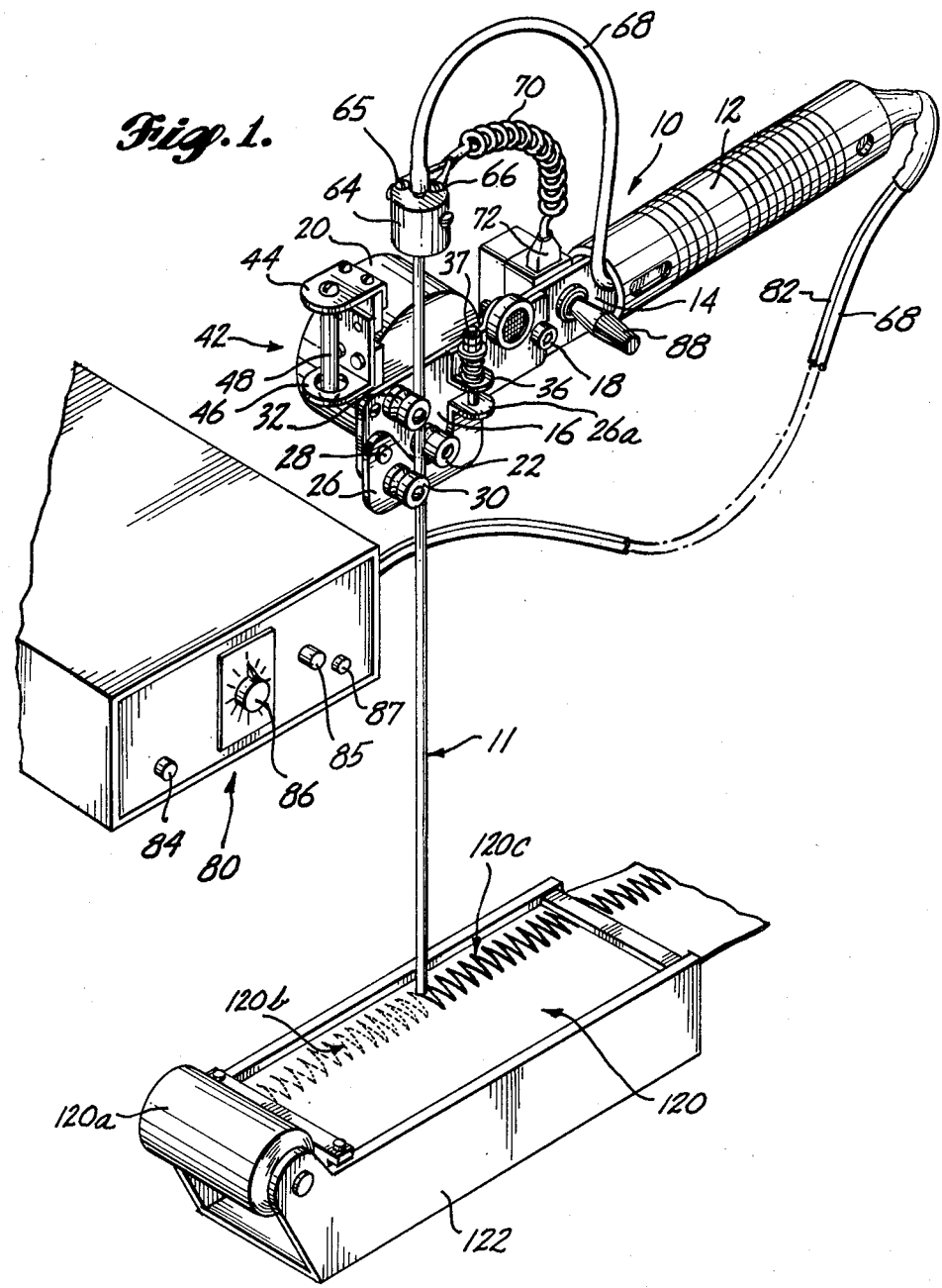
FIG. 1 is an isometric view of the preferred embodiment of the invention, including the simulator handpiece, a combination air and electrical power supply, and a roll of preprinted heat sensitive paper mounted on a specially adapted paper dispenser.
Figure 2:
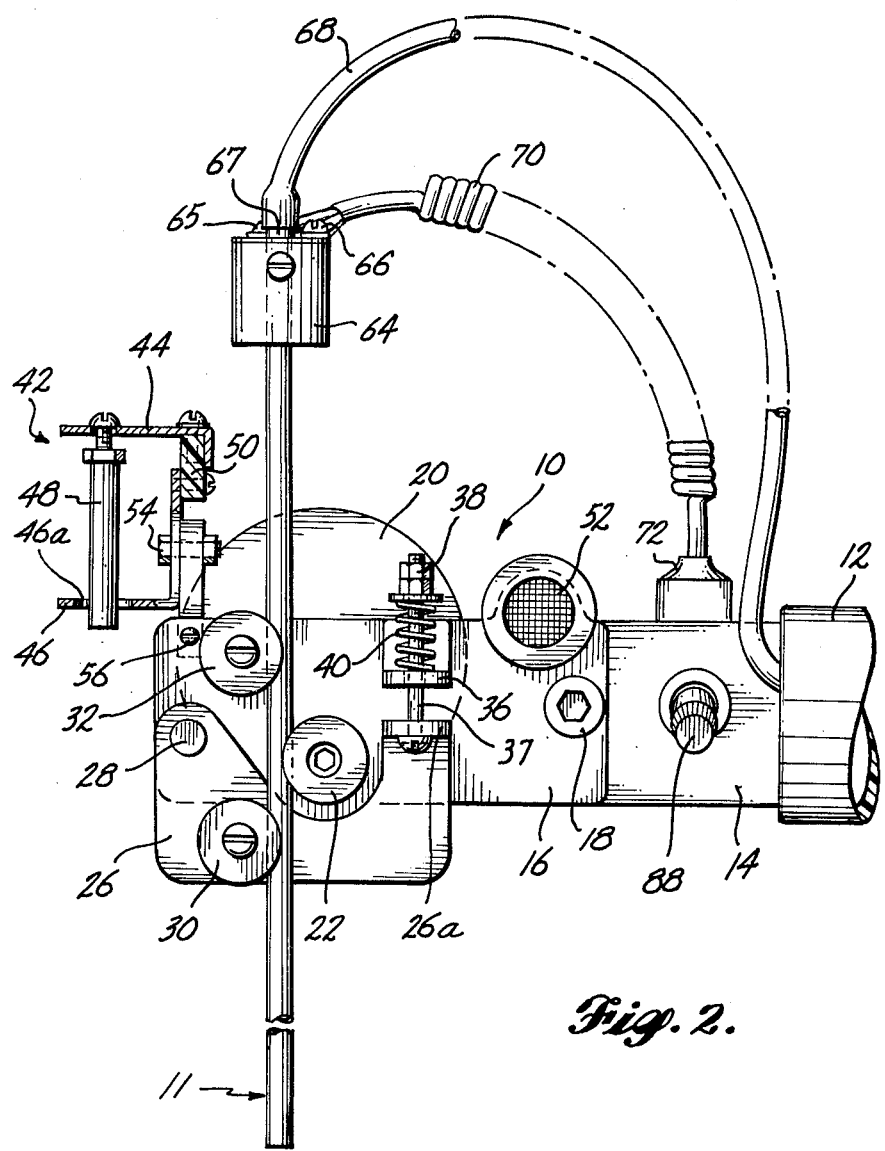
FIG. 2 is a side view of the simulator handpiece.

Referring to FIGS. 1 through 3, the preferred embodiment of the welding simulator of the present invention includes a handpiece 10 that resembles an actual electrode holder in size, weight and shape. The handpiece 10 supports a retractably mounted heat tube 11 that generally resembles an electric arc welding rod, or electrode. The handpiece 10 includes a tubular handle 12 secured about a generally rectangular handpiece base member 14. The base member 14 extends from the front end of the handle 12 and is oriented to extend in a generally upright plane when the handpiece 10 is held in its ordinary position for use. A support plate 16 is pivotably attached to the forward end of the base member 14 by a locking pivot bolt 18. Adjustment of the pivot bolt 18 enables the support plate 16 and heat tube 11 to be disposed at various desired angles with respect to the handle 12.

Attached to one side of the support plate 16 is a six-volt, eight-watt synchronous electric motor 20. The output shaft (not shown) of the motor 20 has a nominal speed of approximately seven rpm. The output shaft extends through an opening in the plate 16 and is coupled to a drive roller 22 positioned on the opposite side of the plate 16 from the motor 20.

A spring-biased pivot plate 26 is pivotably attached to the forward end of the support plate 16 by a pivot pin 28. The pivot plate 26 lies flush against the support plate 16 generally beneath the drive roller 22. A guide roller 30 is rotatably mounted to the pivot plate 26. The guide roller 30 is positioned beneath and forward of the drive roller 22. A second guide roller 32 is rotatably mounted to the support plate 16 directly above the guide roller 30. The rollers 22, 30 and 32 are thus generally arranged in a triangular array suitable to retain the heat tube 11.

Each of the rollers 22, 30 and 32 includes a concave circumferential surface that operates to frictionally engage and guide the heat tube 11, with the heat tube 11 being retained in position between the drive roller 22 on one side and the guide rollers 30 and 32 on the opposite side.

The inner end of the pivot plate 26 nearest the handle 12 includes an outwardly turned, substantially horizontal thumb lever 26a. A fixed bracket 36 extends outwardly from the support plate 16 above the inner end of the pivot plate 26 and parallel to the thumb lever 26a. The bracket 36 and the thumb lever 26a include coaxial apertures through which a machine screw 37 passes. A bias spring 40 encircles the machine screw 37 above the bracket 36 and is retained in position in a compressed state by a washer and a pair of locking nuts 38. The bias spring 40 operates to maintain the inner end of the pivot plate 26 urged upwardly such that the heat tube 11 is firmly engaged between the drive roller 22 and the guide rollers 30 and 32. In this regard, the guide roller 30 is swingable in an arc about the axis of the pivot pin 28 so as to urge the heat tube 11 against each of the fixed rollers 22 and 32. The heat tube 11 may be released and allowed to drop to a starting position by pressing down on the outwardly extending thumb lever 26a of the pivot plate 26 so as to swing the pivot plate 26 slightly downwardly and allow the tube 11 to slip downwardly while guided by the rollers.

In operation, the electric motor 20 turns the drive roller 22 at a speed sufficient to retract the heat tube 11 at a rate of approximately 10 inches per minute. Such a rate simulates the rate at which an actual welding rod is consumed. Each time the heat tube 11 becomes fully retracted, the operator presses down on the thumb lever 26a of the pivot plate 26 to return the tube 11 to the starting position. This can be done with the thumb of the holding hand without releasing the handle 12 so that the user's other hand is at all times free.

The handpiece 10 further includes a tilt switch 42 mounted on the upper, forward corner of the support plate 16. The tilt switch 42 includes substantially parallel upper and lower fixed plates 44 and 46, respectively. The lower plate 46 includes a circular aperture 46a. A cylindrical brass rod 48 is pivotally suspended from the top plate 44 for universal pivotal motion and extends through the aperture 46a. The upper and lower plates 44 and 46 form conductors of the tilt switch and are separated by an insulator 50. The brass rod 48 and the lower plate 46 form contacts of the tilt switch which, when closed, actuates a piezoelectric buzzer 52 attached to the inner end of the support plate 16. The relative diameters of the brass rod 48 and the aperture 46a are such that the tilt switch is closed whenever the longitudinal axis of the brass rod 48 deviates from the central axis of the aperture 46a by more than approximately 15°. The tilt switch 42 is adjustable laterally by means of a fastener 54 attaching the tilt switch to the support plate 16, and is adjusted in a longitudinal direction relative to the plate 16 by means of a fastener 56.

Referring to FIGS. 1 and 2, a cylindrical nylon plug 64 is attached to the upper end of the heat tube 11. The plug 64 includes a pair of electrical terminals 65 and 66. A brass tube 67, described further below, extends upwardly from inside the tube 11 and passes through the plug 64. A length of flexible rubber tubing 68 is connected to the brass tube 67 and passes therefrom through the handle 12. A length of flexible coiled electrical wiring 70 is connected at one end to the terminals 65 and 66, and is connected at its opposite end to an electrical plug 72.

Referring to FIG. 1, a remote power and air supply unit 80 provides a flow of pressurized air to the handpiece 10 through the rubber tubing 68. Air is provided by a 110-volt, four-watt air pump that is actuated by a switch 84 located on the front panel of the power supply unit 80. Air flow is regulated by a bleed valve 85 also located on the front panel. The power supply unit 80 also provides a six-volt power supply signal through electrical wiring 82. The power applied through wiring 82 drives the motor 20 as well as a heating element located in the tip of the heat tube 11, as further described below. The six-volt power supply is controlled by a five-minute timer 86 located on the front panel of the unit 80. A pilot light 87 indicates when the power supply is actuated. Additionally, electrical power applied to the motor 20 and the heating element in the tip of the heat tube 11 is controlled by an ON/OFF switch 88 mounted on the base member 14 of the handpiece 10.

FIG. 3 illustrates in detail the construction of the heating element in the tip of the heat tube 11. The heat tube 11 contains coaxially located therein the thin wall brass tube 67, which is spaced from the inside walls of the heat tube 11 by a plurality of insulating spacers 112. The heat tube 11 and the interior brass tube 67 form electrical conductors for the six-volt power source used to heat air passing through the tube 67, as further described below. The brass tube 67 terminates at a distance from the tip of the heat tube 11. A terminal brass fitting 114 is press-fitted into the end of the brass tube 67. The terminal fitting 114 includes a central bore 114a. Extending from the terminal fitting 114 is a small diameter air orifice tube 116 having an internal bore 116a. The bore 116a of the tube 116 is aligned with the bore 114a of the terminal fitting 114 so as to be in communication with the bore of the brass tube 67. A suitable orifice tube 116 is formed of stainless steel and has an inside bore diameter of approximately 0.007 inch.

The air orifice tube 116 is heated by means of a nichrome wire heating element 118 wrapped around the tube 116. One end of the heating element 118 is pressed into contact with the inside surface of the brass tube 67 by means of an external spiral slot (not shown) and an annular groove 114c formed in the exterior surface of the fitting 114. The opposite end of the heating element 118 is connected to the inside surface of the heat tube 11 adjacent the tip of the tube 11, for example, by a spot weld.

The air orifice tube 116 and the heating element 118 are electrically insulated from the heat tube 11 by means of a glass or ceramic sleeve 122. The sleeve 122 is retained inside the bore of the heat tube 11 by means of a porcelain bushing 124 press-fitted into the end of the heat tube 11. The porcelain bushing 124 includes a central bore to accommodate the air orifice tube 116, as well as a passage for the nichrome heating element 118.

Power is ordinarily applied to the heating element 118 by means of the switch 88 located on the side of the handpiece 10. The switch 88 provides power to the heating element 118 through the flexible cord 70, and provides power to the drive motor 20 and the piezoelectric buzzer 52 (through the tilt switch 42) through conventional electrical wiring (not shown).

In practice, air from the heat tube 11 is directed onto a strip of heat-sensitive paper 120, shown in FIG. 1. Such paper is commercially available, for example, for use in various types of office equipment. Preferably, a roll of paper 120a is mounted on a dispenser 122 adapted to hold a strip of paper conveniently supported and backed by a solid surface. The paper 120 is imprinted with a predetermined pattern 120b that resembles the actual pattern of movement that would be followed in forming an electric arc weld joint. The pattern 120b illustrated in FIG. 1 is representative of one such pattern of movement, although other patterns may be used depending on the type of weld joint being simulated. In practice, a trainee seeks to superimpose a thermal trace, designated as 120c in FIG. 1, on top of the printed pattern 120b. Any variation that the trainee allows to occur in the distance from the tip of the heat tube 11 to the paper 120 is indicated by variations in the density of the thermal trace. Also, variations in the angle at which the handpiece is held are indicated by changes in the shape of the thermal trace, and may also be indicated by the piezoelectric buzzer 52.

Although the present invention is described and illustrated herein by reference to a preferred embodiment, it will be understood that various modifications, alterations and substitutions may be made without departing from the spirit of the invention. Accordingly, the scope of the present invention is defined entirely by the following claims.

The embodiments of the invention in which an exclusive property or privilege is claimed are defined as follows:

1. A welding simulator for use with heat-sensitive paper, comprising a handpiece having a heat tube retractably mounted thereon, air supply means coupled to said heat tube for providing a stream of hot air through said tube so as to be projected from one end of said tube, heating means for heating the air projected from said heat tube, and drive means mounted on said handpiece for retracting said tube at a predetermined rate to simulate consumption of an electric arc welding rod.

2. The welding simulator defined in claim 1 wherein said heating means comprises an electric heating element located in the tip of said heat tube adjacent said one end of said tube.

3. The welding simulator defined in claim 2 wherein said handpiece further comprises a tilt indicator switch responsive to deviations in the orientation of said handpiece from a selected orientation, said tilt indicator switch being operable to actuate an alarm whenever said handpiece is held in a position deviating from said selected orientation by more than a predetermined angle.

4. The welding simulator defined in claim 3 wherein said heat tube includes an air flow constriction tube coaxially affixed in the tip of said heat tube for forming a narrow stream of air projecting from said the tip of said heat tube, and wherein said heating element includes a nichrome heating element coiled around said air flow constriction tube.

5. The welding simulator defined in claim 4 wherein said handpiece includes an upright support plate, and wherein said drive means comprises an electric motor mounted on one side of said support plate, said electric motor including a drive shaft extending through an opening in said support plate, said drive shaft being coupled to a drive roller located on the opposite side of said suport plate from said drive motor, said drive roller having a concave circumferential drive surface, and means for selectively maintaining said heat tube urged against said concave circumferential drive surface of said drive roller during retraction of said heat tube.

6. The welding simulator defined in claim 5 wherein said means for maintaining said heat tube maintained against said drive surface of said drive roller includes a pivot plate swingably mounted to said support plate for swinging motion in a plane parallel to and immediately adjacent said support plate, said pivot plate including a first guide roller journalled thereto and extending perpendicularly therefrom, said handpiece further including a second guide roller journalled to said support plate, said first and second guide rollers each having concave circumferential guide surfaces, said first and second guide rollers being positioned on the opposite side of said heat tube from said drive roller and spaced along said heat tube in oposite directions from said drive roller, and spring bias means connecting said pivot plate to said support plate so as to maintain said first guide roller urged against said heat tube to thereby securely engage said heat tube between said drive roller and said guide rollers, and whereby said pivot plate may be manually pivoted to release said heat tube for extension to a starting position.

7. The welding simulator defined in claim 6 wherein said support plate is pivotably connected to said handpiece and is selectively pivotable to position said heat tube at selected orientations with respect to said handpiece.

8. The welding simulator defined in claim 7 wherein said tilt switch comprises a frame member having upper and lower electrically conductive plates, said frame member being mounted on said handpiece such that said upper and lower plates are oriented generally horizontally when said handpiece is held in its ordinary position for use, said lower plate including a substantially circular opening, said tilt switch further including a cylindrical contact rod suspended from said upper plate for universal pivotal motion, said rod extending through said opening in said lower plate, said rod and said upper plate forming one contact element of said tilt switch and said lower plate forming the other contact element of said tilt switch, whereby rotation of said tilt switch by more than said predetermined angle from a substantially horizontal position closes said switch and actuates said alarm.

9. The welding simulator defined in claim 8 wherein the relative diameters of said contact rod and said circular opening in said lower plate of said tilt switch are selected such that said predetermined angle is approximately fifteen degrees.

10. The welding simulator defined in claim 9 wherein said tilt switch is mounted on said support plate of said handpiece.

11. The welding simulator defined in claim 10 wherein said alarm includes a piezoelectric acoustic emitter mounted on said handpiece.

12. The welding simulator defined in claim 1 wherein said handpiece further comprises a tilt indicator switch responsive to deviations in the orientation of said handpiece from a selected orientation, said tilt indicator switch being operable to actuate an alarm whenever said handpiece is held in a position deviating from said selected orientation by more than a predetermined angle.

13. The welding simulator defined in claim 2 wherein said air supply means comprises a remote air pump and a length of flexible tubing extending from said air pump to said handpiece and connected to the upper end of said heat tube.

* * * * *

UNITED STATES PATENT AND TRADEMARK OFFICE
CERTIFICATE OF CORRECTION

PATENT NO. : 4,452,589
DATED : June 5, 1984
INVENTOR(S) : Tom G. Denison

It is certified that error appears in the above-identified patent and that said Letters Patent is hereby corrected as shown below:

Column 7, line 2: "maintained" second occurrence should be --urged--.

Signed and Sealed this

Sixteenth Day of October 1984

[SEAL]

Attest:

GERALD J. MOSSINGHOFF

Attesting Officer

Commissioner of Patents and Trademarks